United States Patent Office.

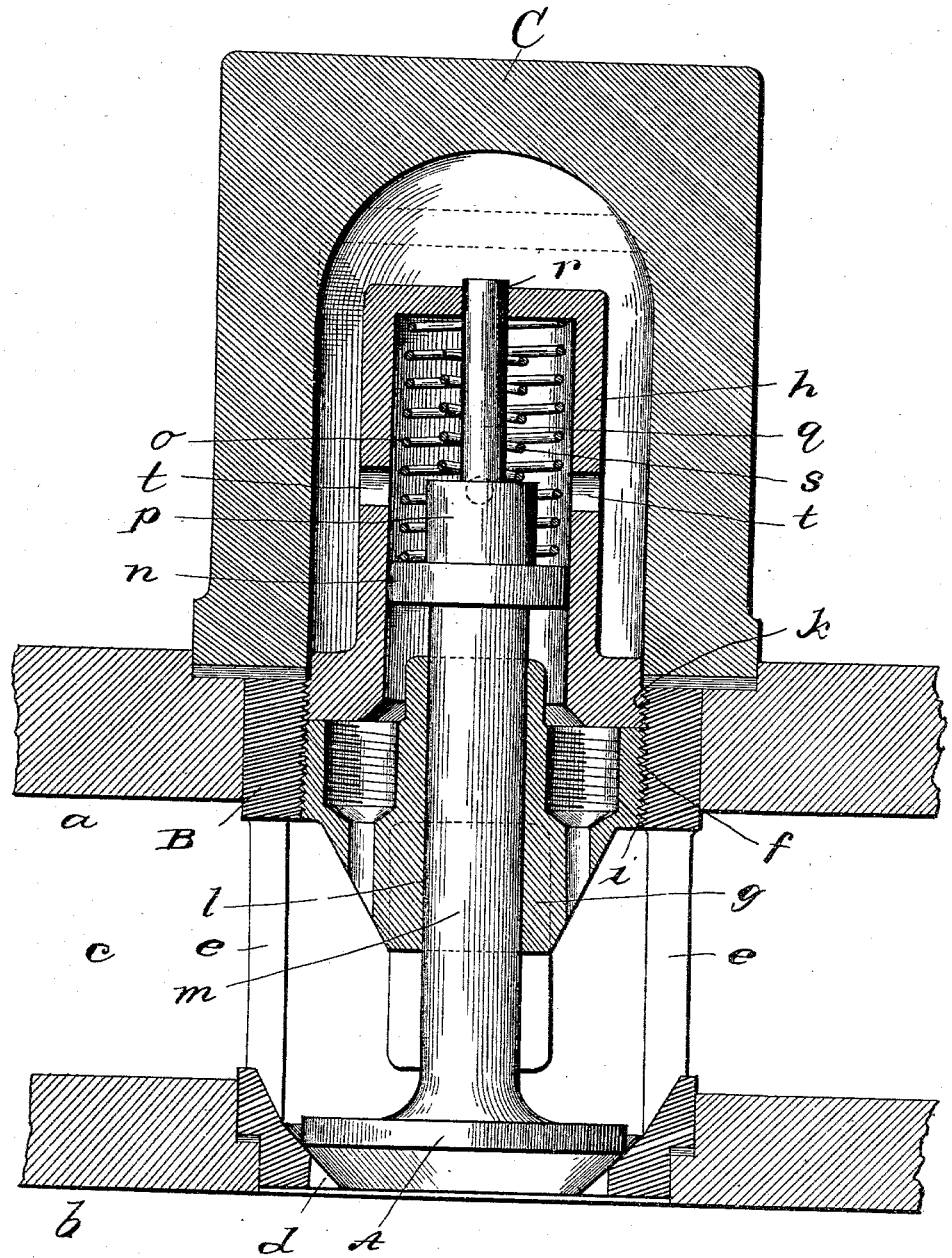

CHARLES DICKERMAN, OF PHILADELPHIA, PENNSYLVANIA, ASSIGNOR TO THE PENNSYLVANIA IRON WORKS COMPANY, OF SAME PLACE.

VALVE FOR COMPRESSORS.

SPECIFICATION forming part of Letters Patent No. 545,123, dated August 27, 1895.

Application filed February 14, 1895. Serial No. 538,394. (No model.)

*To all whom it may concern:*

Be it known that I, CHARLES DICKERMAN, a citizen of the United States, residing at Philadelphia, in the county of Philadelphia and State of Pennsylvania, have invented certain new and useful Improvements in Valves for Compressors; and I do hereby declare the following to be a full, clear, and exact description of the invention, such as will enable others skilled in the art to which it appertains to make and use the same.

My present invention relates to compressors for gas or air, and has especial reference to eduction-valves; and it consists in certain improvements in construction, which will be fully disclosed in the following specification and claims.

In valves of this class it is the practice to have the spring or springs for cushioning and closing the valve in the dome or cap surmounting the valve, which is liable to become disarranged or the relation of one to the other varied in tightening down the cap, which frequently results in an uneven seating of the valve. It is my purpose to provide a valve in which the valve and the springs shall be contained within the valve-cage, and thus obviate the difficulty referred to.

In the accompanying drawing, which forms part of this specification, is shown a vertical transverse section of my improved valve.

Reference being had to the drawing and the letters thereon, A indicates the valve, of usual construction, for controlling the eduction or discharge of gas or air from compressor-cylinders, the upper or end walls of which are indicated by the letters $a$ $b$ and the chamber between said walls by $c$.

B is the valve-cage proper, which is provided with the usual ports $d$ at its bottom and $e$ in its wall, and at the upper end of the cage is an internal screw-thread $f$, with which the guide $g$ and the cylindrical extension $h$ of the valve-cage engage by their respective screw-threaded portions or parts $i$ $k$. The guide $g$ is provided with a central bore $l$ of the diameter of the stem $m$, and on the valve-stem is a collar $n$, which forms a seat for the valve-closing spring $o$, which surrounds the upper end $p$ of the valve-stem and rests upon the collar $n$. The valve-stem $m$ terminates in a reduced extension $q$, which extends through an opening $r$ in the upper end of the cylindrical extension $h$ of the valve-cage and constitutes an additional guide for the valve-stem proper, and the collar $n$ fits the bore of the cylindrical extension, so that the valve-stem is guided and secured against lateral movement or displacement by the guide $g$, the extension $q$, and the collar $n$. On the upper end of the stem $m$ and around the reduced extension $q$ thereof is a spring $s$ to cushion the valve when it is opened by the pressure of the gas or air in the compressor-cylinder, and the valve is returned to its seat again or closed by the resiliency of the spring $o$. The extension $h$ is screwed into the valve-cage by a spanner or wrench which engages the holes $t$ $t$ in the wall thereof. The valve thus constructed with the valve, its guide $g$, and springs within the valve-cage is inserted in the cylinder-head of the compressor and covered with the usual dome or cap C; but it does not come in contact with the valve or springs, so that it cannot in any way interfere therewith to disarrange the springs or cause irregular seating of the valve, and the valve-stem guide $g$, being separable from the valve-cage, may be readily removed when worn and a new one inserted without the loss of the entire valve-cage.

Having thus fully described my invention, what I claim is—

1. A valve-cage provided with a tubular guide and a hollow cylindrical extension, both of which are detachably connected thereto and the latter provided with an opening in its outer end, in combination with a valve seated in the cage and having a collar on the stem thereof, a spring resting upon said collar and the outer end of the valve stem engaging the opening in the outer end of the cylindrical extension.

2. A valve-cage having an internal screw-thread at its upper end and provided with a tubular guide having an external screw thread and with a hollow cylindrical extension having an external screw-thread and both of which screw-threads engage with the screw-thread of the valve cage, in combination with a valve seated in said cage and having a stem with a collar thereon, and a spring seated on said collar.

In testimony whereof I affix my signature in presence of two witnesses.

CHARLES DICKERMAN.

Witnesses:
 HOWLAND CIRT,
 J. R. BENNINGLY.